United States Patent [19]

Fox et al.

[11] Patent Number: 5,099,179
[45] Date of Patent: Mar. 24, 1992

[54] REMOTE RASTER/STROKE DISPLAY CALIBRATION

[75] Inventors: Alan L. Fox, Huntsville, Ala.; Teddy J. Wood, Tigard, Oreg.; Laura D. Clark, Oak Ridge, Tenn.

[73] Assignee: Honeywell Inc., Minneapolis, Minn.

[21] Appl. No.: 557,606

[22] Filed: Jul. 24, 1990

[51] Int. Cl.$^5$ .................. H01J 31/26; H01J 29/70
[52] U.S. Cl. .................. 315/367; 315/368.11
[58] Field of Search .............. 358/67, 69, 139, 10, 358/148; 340/736, 739, 741; 315/370, 379, 368, 10, 367

[56] References Cited

U.S. PATENT DOCUMENTS

| | | | |
|---|---|---|---|
| 4,099,092 | 7/1978 | Bristow | 315/367 |
| 4,203,054 | 5/1980 | Sowter | 315/368 |
| 4,673,986 | 6/1987 | Jenness | 315/370 |
| 4,769,703 | 9/1988 | Osborne et al. | 358/139 |
| 4,812,713 | 3/1989 | Blanchard | 358/69 |
| 4,935,674 | 6/1990 | Rodriguez-Cavazos | 315/368 |

*Primary Examiner*—Alvin E. Oberley
*Assistant Examiner*—Steve Saras
*Attorney, Agent, or Firm*—Ronald E. Champion; Roger W. Jensen

[57] ABSTRACT

A remote registration and calibration system for a hybrid video display. The registration and calibration functions are performed by a computer. Display mounted switches are advantageously employed. The computer system samples the state of an array of switches and then performs calibration functions based on the state of the switches.

10 Claims, 1 Drawing Sheet

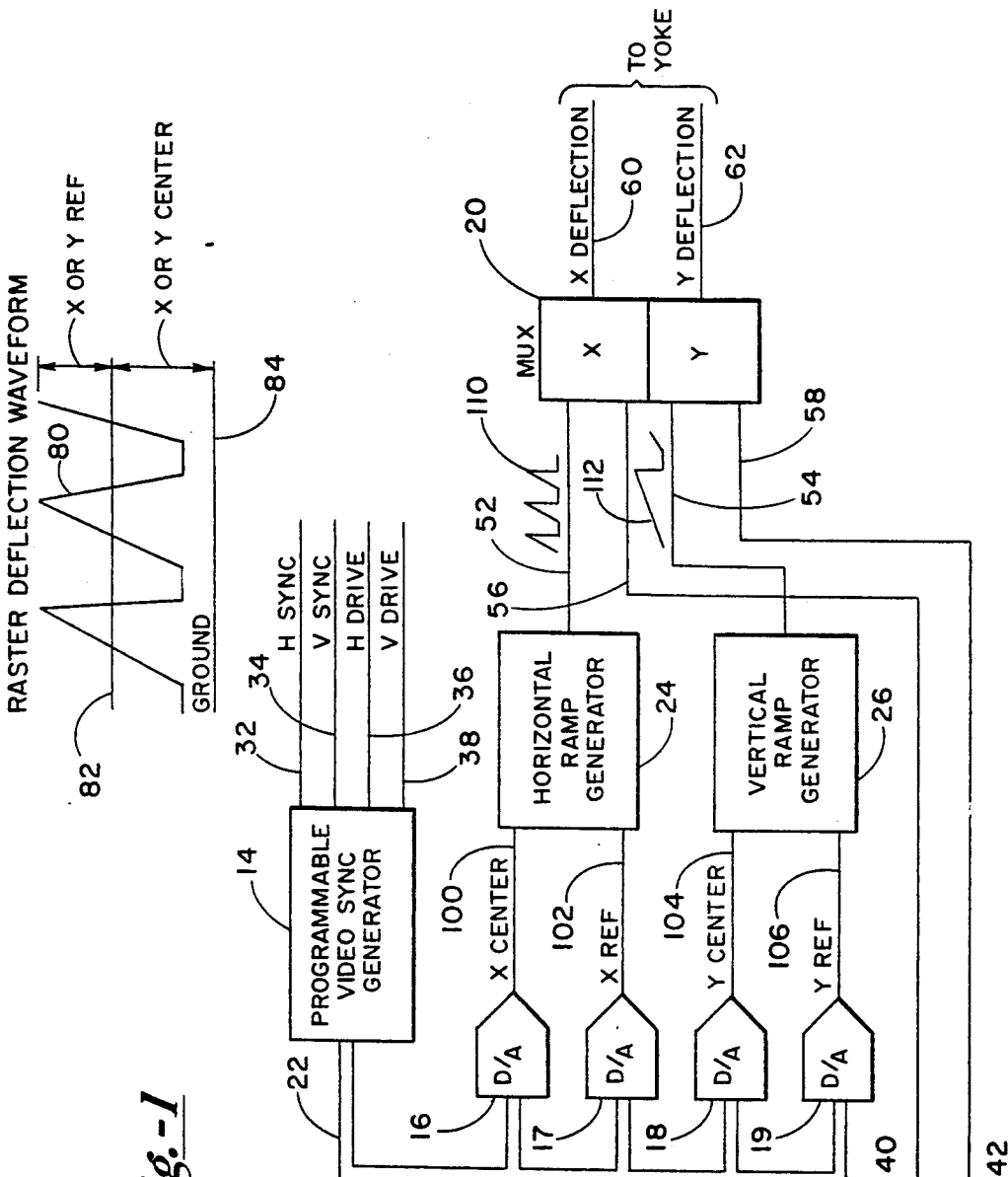

REMOTE RASTER/STROKE DISPLAY CALIBRATION

US GOVERNMENT RIGHTS

The United States Government has contributed to the design and development of the invention herein and, thereby, has acquired ownership of certain rights in the invention.

BACKGROUND OF THE INVENTION

This invention relates to a method and apparatus for remote calibration of a raster or stroke written video display.

Video display devices that have the ability to display either raster scanned information or stroke written information are called hybrid displays. Hybrid displays are usually calibrated by registering the raster and stroke display beams in relation to one another. In addition, both the stroke and raster circuits need to be calibrated so that each display type has the same point of reference on the screen. Registration and calibration is presently accomplished by the manual adjustment of potentiometers or the use of hand selected resistors.

To be effective, the adjustment of registration potentiometers and resistors must occur in a display system that is under power. This poses serious health and safety risks to those working on and around the display. For example, voltage in the powered display may be 25,000 volts or more. In addition, it is possible to damage the display device by the introduction of foreign materials and objects while the display is exposed and powered.

Periodically, raster and stroke displays need recalibration. Recalibration similarly requires the adjustment of a plurality of potentiometers. Typically the potentiometers needing adjustment are not easily accessible to a technician on display unit since the display unit is usually environmentally sealed.

SUMMARY OF THE INVENTION

It is one object of the present invention to calibrate and register both the raster and stroke display beams on a video display system operating in hybrid mode.

It is a further object of the invention to allow the person calibrating the system to do so remotely and thus safely.

It is a further object of the invention to permit the calibration and registration though a set of switches mounted on the face of the video display.

It is yet another object of the invention to provide remote registration and calibration features on a display unit thereby allowing multiple video formats.

It is yet another object of the invention to provide remote registration and calibration features on a display unit thereby allowing multiple aspect ratios.

It is yet another object of the invention to provide remote registration and calibration features on a display unit thereby allowing for multiple sync patterns.

In order to achieve the aforesaid objects, features and advantages, the invention provides a remote registration and calibration system for a hybrid video display, wherein the registration and calibration functions are performed by a computer. Display mounted switches are advantageously employed. The computer system samples the state of an array of switches and then performs o calibration functions based on the state of the switches. Calibration functions are carried out by a digital/analog converter which controls the horizontal and vertical sync and drive, x center, x reference, y center and y reference, of the display.

BRIEF DESCRIPTION OF THE DRAWINGS

To illustrate the invention, a preferred embodiment of this invention will be described hereinafter with reference to the accompanying figures. The preferred embodiment concerns a remote calibration system for a hybrid video display.

FIG. 1 shows a schematic of one embodiment of a remote calibration and registration system as provided by the present invention.

FIG. 2 shows a raster deflection waveform graph depicting the x and y reference signal and x and y center signal in relation to ground.

The invention provides a means to register and calibrate a hybrid video display, wherein the registration and calibration functions are performed by a computer. Display mounted switches are used to control a programmable video sync generator and a horizontal and vertical ramp generator which produce appropriate synchronization and deflection signals.

DESCRIPTION OF THE PREFERRED EMBODIMENT

Referring now to FIG. 1, a schematic diagram of one example of a remote calibration system as provided by the invention is shown. The remote calibration system comprises a switch array 10, a microprocessor 12, a nonvolatile RAM 30, a programmable video sync generator 14, a first digital-to-analog converter (DAC) 16, a second digital to analog converter 17 a third digital-to-analog converter 18 and a fourth digital-to-analog converter 19, a horizontal ramp generator 24, a vertical ramp generator 26 and a video multiplexer (MUX) 20.

The microprocessor 12, nonvolatile RAM 30, programmable video sync generator 14, DACs, 16-19, horizontal ramp generator 24, vertical ramp generator 26 and video MUX 20 may comprise well known, commercially available devices. In one embodiment of the invention, a model 8751 microcontroller was advantageously employed to perform the functions of microprocessor 12. The 8751 microcontroller includes four 8 bit I/O ports, two internal timers, an 8 bit serial port and two external interrupts rendering it a very useful device for housekeeping functions.

In one embodiment of the invention, the switch array 10 is connected to the microprocessor 12 so that the switches may be scanned by the microprocessor for their position or state. The microprocessor 12 responds to the states of the switch array by providing control signals and data signals 22 to the programmable video sync generator 14 and the digital to analog converters (DACs) 16, 17, 18 and 19. The microprocessor control program and display settings are stored in a non-volatile RAM 30 connected to the microprocessor. The programmable video sync generator provides the horizontal sync signal (H SYNC) 32, vertical sync signal (V SYNC) 34, horizontal drive signal (H DRIVE) 36 and vertical drive signal (V DRIVE) 38. The first DAC's output 100 is connected to the x center input of the horizontal ramp generator 24. The second DAC's output 102 is connected to the x reference (X REF) of the horizontal ramp generator 24. The third DAC's output 104 is connected to the vertical ramp generators y center input and the fourth DAC's output 106 is connected to the vertical ramp generator's y reference (Y REF) input.

The video multiplexer has first, second, third and fourth inputs 52, 54, 56 and 58 respectively. The video multiplexer further includes first and second outputs 60 and 62. The output of the horizontal ramp generator 24 is connected to the first input 52 of the video multiplexer 20. An example of an output waveform from the horizontal ramp generator is shown as waveform 110. The output of the vertical ramp generator is attached to the third input 56 of the video multiplexer 20. An example of an output waveform from the vertical ramp generator is shown as waveform 112. Design of the horizontal and vertical ramp generators is accomplished using well known conventional circuits. The second input 54 of the video multiplexer 20 is attached to the external x stroke deflection signal 40 and the fourth input 58 of the video multiplexer 2 is attached to the y stroke deflection signal 42. The first output 60 of the video multiplexer 20 is used as a horizontal deflection signal 60 for the display and the second output 62 of the video multiplexer 20 is used as a vertical deflection signal 62 for the display.

Now referring to FIG. 2, a plot of the display reference and center signals are shown. Signal plot 82 indicates the magnitude of the applied voltage relative to ground 84 for the x or y center signal. Signal plot 80 indicates the magnitude of the applied voltage relative to ground 84 for the x or y reference signal.

Now referring again to FIG. 1, the operation of the system as shown in one embodiment x will be described. The microprocessor 12 is programmed in a well known manner to have a calibration mode and a running mode. The H DRIVE and V DRIVE signals are essentially under the control of the microprocessor 12 through its control of the programmable video sync generator 14, and the H DRIVE and V DRIVE may be varied in a well-known manner, such as by pulse width changes, under the microprocessor control. Similarly, the H SYNC and V SYNC signals are also controlled by the microprocessor. The microprocessor also supplies control information through the DACs to control the x and y deflection signals. Further, since the microprocessor 12 is also connected to the array of switches 10 the unit may be calibrated utilizing the switches.

During calibration mode the operator uses the switches 68 on the bezel switch array to adjust the raster up or down, left or right in response to the plurality of test patterns displayed on the video display by the programmable video sync generator 14. The operator supplies a predetermined dedicated multiswitch code through the bezel switches. The microprocessor interprets the code and vectors to a calibration routine.

Once in calibration mode, the microprocessor recognizes designated switches as corresponding to predetermined alignment adjustments and the microprocessor generates control signals to the DACs and programmable video sync generator. In this way the output signals 110 and 112 from the horizontal ramp generator and vertical ramp generator respectively, are adjusted. The above-described calibration operation creates the same effect as prior calibration methods which varied the potentiometers controlling the displays deflection mechanisms. Once the operator is satisfied with the alignment, another unique switch combination is issued. Those skilled in the art will recognize that the switch combinations selected may be many and varied and that it is well within the skill of those in the art to choose an appropriate set of switch patterns for use in operation of the invention. The registration data is then saved to non-volatile RAM 30 for use in running mode. During running mode, the offsets derived in calibration mode are applied to external display signals. This mechanism provides for constant beam calibration.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment details and operating procedures, can be accomplished without departing from the scope of the invention itself.

What is claimed is:

1. A remote hybrid, stroke and raster, display calibration system comprising:
   (a) a microprocessor;
   (b) an array of switches connected to the microprocessor for entering calibration and registration data;
   (c) a non-volatile RAM connected to the microprocessor;
   (d) a programmable video sync generator connected to the microprocessor;
   (e) a first digital-to-analog converter (DAC) connected to the microprocessor for generating an x center signal;
   (f) a second DAC connected to the microprocessor for generating an x reference signal;
   (g) a third DAC connected to the microprocessor system for generating a y center signal;
   (h) a fourth DAC connected to the microprocessor system for generating the y reference signal;
   (i) a horizontal ramp generator having a first input connected to the output of the first DAC and second input connected to the second DAC and having a horizontal ramp signal output;
   (j) a vertical ramp generator having a first input connected to the output of the third DAC and second input connected to the output of the fourth DAC and having a vertical ramp output; and
   (k) a video multiplexer having to the output of the horizontal ramp generator, a second input connected to an external x stroke deflection signal, a third input connected to the output of the vertical ramp generator and a fourth input connected to an external y stroke deflection signal.

2. The system of claim 1 wherein the switch array is mounted on a display bezel.

3. A remote hybrid, stroke and raster, display calibration system comprising:
   (a) means for processing calibration and registration data and generating a plurality of DRIVE and SYNC control signals and a plurality of deflection control signals;
   (b) a switching means for entering calibration and registration data into the processing means wherein the switches are connected to the processing means;
   (c) a memory means connected to the processing means for storing the calibration and registration data;
   (d) a programmable video sync generator means wherein the programmable video sync generator is connected to the processing means and generates horizontal and vertical DRIVE and SYNC display signals in response to DRIVE and SYNC control signals received from the processing means;

(e) a first digital-to-analog converter (DAC) means for converting digital signals to analog signals wherein the first DAC is connected to the processing means and generates an x center signal in response to the deflection control signals received from the processing means;

(f) a second digital-to-analog converter (DAC) means for converting digital signals to analog signals wherein the second DAC is connected to the processing means and generates an x reference signal in response to the deflection control signals received from the processing-means;

(g) a third digital-to-analog converter (DAC) means for converting digital signals to analog signals wherein the third DAC is connected to the processing means and generates a y center signal in response to the deflection control signals received from the processing means;

(h) a fourth digital to analog converter (DAC) means for converting digital signals to analog signals wherein the fourth DAC is connected to the processing means and generates a y reference signal in response to the deflection control signals received from the processing means;

(i) a first ramp generator means to generate a horizontal ramp signal wherein the vertical ramp generator has a first input connected to the output of the first DAC means and a second input connected to the second DAC means and a horizontal ramp signal output;

(j) a second ramp generator means to generate a vertical ramp signal wherein the vertical ramp generator has a first input connected to the output of the third DAC means and a second input connected to the fourth DAC means and a vertical ramp signal output; and (k) a video multiplexer means for multiplexing the output of the horizontal ramp generator and an external x stroke deflection signal and for multiplexing the output of the vertical ramp generator and an external, y stroke deflection signal so as to generate an x deflection signal and a y deflection signal.

4. The system of claim 3 wherein the means for switching is mounted on a display bezel.

5. The system of claim 1 wherein the calibration and registration data comprise codes derived from predetermined switch combinations.

6. The system of claim 3 wherein the calibration and registration data comprise codes derived from predetermined switch combinations.

7. A method for remote calibration of a hybrid, stroke and raster system including means for processing switch means for entry of calibration and registration data, programmable video sync generator means, first through fourth digital-to-analog converter (DAC) means, first and second ramp generator means and a video multiplexer means, comprising the steps of:

(a) operating the switching means to enter calibration and registration data;

(b) operating the processing means to receive the calibration and registration data and to generate a plurality of DRIVE and SYNC control signals and a plurality of deflection control signals in response to the calibration and registration data;

(c) operating the video sync generator means to generate horizontal and vertical DRIVE and SYNC display signals in response to the plurality of deflection control signals;

(d) operating the first DAC means to generate an x center signal in response to at least one of the plurality of deflection control signals;

(e) operating the second DAC means to generate an x reference signal in response to at least one of the plurality of deflection control signals;

(f) operating the third DAC means to generate a y center signal in response to at least one of the plurality of deflection control signals;

(g) operating the fourth DAC means to generate a y reference signal in response to at least one of the plurality of deflection control signals;

(h) operating the first ramp generator means to generate a horizontal ramp signal wherein the vertical ramp generator has a first input connected to the output of the first DAC means and a second input connected to the second DAC means and a horizontal ramp signal output;

(i) operating the second ramp generator means to generate a vertical ramp signal wherein the vertical ramp generator has a first input connected to the output of the third DAC means and a second input connected to the fourth DAC means and a vertical ramp signal output; and (j) operating the video multiplexer means to multiplex the output of the horizontal ramp generator and an external x stroke deflection signal and to multiplex the output of the vertical ramp generator and an external, y stroke deflection signal so as to generate an x deflection signal and a y deflection signal.

8. The method of claim 7 wherein the means for switching is mounted on a display bezel.

9. The method of claim 7 wherein the calibration and registration data comprise codes derived from predetermined switch combinations.

10. The method of claim 8 wherein the calibration and registration data comprise codes derived from predetermined switch combinations.

* * * * *

UNITED STATES PATENT AND TRADEMARK OFFICE
CERTIFICATE OF CORRECTION

PATENT NO. : 5,099,179
DATED : March 24, 1992
INVENTOR(S) : Alan L. Fox, Teddy J. Wood, and Laura D. Clark It is certified that error appears in the above-indentified patent and that said Letters Patent is hereby corrected as shown below:

Column 4, line 45, after "having" insert --a first input connected--.

Signed and Sealed this

Fifteenth Day of March, 1994

Attest:

BRUCE LEHMAN

Attesting Officer   Commissioner of Patents and Trademarks